United States Patent [19]
Yang

[11] Patent Number: 5,235,421
[45] Date of Patent: Aug. 10, 1993

[54] ENCODING DEVICE IN A SUPER HIGH DEFINITION TELEVISION SYSTEM AND METHOD THEREOF

[75] Inventor: Tae-Kwon Yang, Suwon, Rep. of Korea

[73] Assignee: SamSung Electronics, Ltd., Suwon, Rep. of Korea

[21] Appl. No.: 715,648

[22] Filed: Jun. 14, 1991

[30] Foreign Application Priority Data

Jun. 25, 1990 [KR] Rep. of Korea ................... 9402

[51] Int. Cl.$^5$ .................... H04N 7/00; H04N 11/00
[52] U.S. Cl. ................................... 358/141; 358/11; 358/133
[58] Field of Search ............... 358/138, 12, 11, 133, 358/141

[56] References Cited

U.S. PATENT DOCUMENTS

4,987,480  1/1991  Lippman et al. ............... 358/133
5,021,882  6/1991  Schreiber ...................... 358/12

Primary Examiner—James J. Groody
Assistant Examiner—David E. Harvey
Attorney, Agent, or Firm—Robert E. Bushnell

[57] ABSTRACT

An encoding device for selectively transmitting not only the picture of a 1×NTSC level but also the super-high resolution pictures of 2×NTSC, 3×NTSC or 4×NTSC levels, by reducing the bandwidth of sub-bands and by using a sub-band coding technique in the case where the bandwidth of channels is restricted. The device includes a 3-dimensional low pass filter 4 for separating the signal output from an A/D converter 3 into 3-dimensional sub-blocks of chrominance signal, and a matrix circuit 5 for separating the signals output from the A/D converter 3 into luminance and chrominance signals. Furthermore, a horizontal, vertical and temporal QMFs 6, 8 and 10 divides the luminance signal into a plurality of horizontal, vertical and temporal sub-blocks in the direction of a horizontal, vertical and temporal axes and compresses the above sub-blocks. A motion detector 15 detects a motion signal corresponding to a still region, a semi-motion region and a motion region. An adaptive filter selector 16 selectively generates the signal of high band luminance sub-block signals output from the temporal QMF 10. A multiplexer 17 multiplexes the sub-block of chrominance signals output from the 3-dimensional low pass filter 4, the low band sub-block signals output from the temporal QMF 10, and the high band sub-block signals output from the adaptive filter selector 16.

14 Claims, 6 Drawing Sheets

ENCODING DEVICE IN A SUPER HIGH DEFINITION TELEVISION SYSTEM AND METHOD THEREOF

BACKGROUND OF THE INVENTION

The present invention relates to an encoding device for a super high definition (to be called hereinafter "HD") system and a method thereof, in which signals are transmitted using a sub-band coding technique for a superhigh resolution system having scanning lines 4 times that of an NTSC, and in which signal transformations between the NTSC system and an extended definition television (to be called hereinafter EDTV) and the existing HD TV become possible in accordance with the band width compressing ratios.

HD-TVs which are proposed so far aim at obtaining a picture quality comparable to the resolution of the 35 mm motion picture sampling encoder (MUSE) system of Japan, the HD-MAC system of Europe and the advanced TV (ATV) system of the United States were developed.

However, if a picture of over 300 inches with the resolution of photographs is to be regenerated, there is required a HD-TV system having a superhigh resolution corresponding not to a 35 mm motion picture film but to a 70 mm motion picture film. Further, there is also required a multi-purpose superhigh resolution HD-TV system for military and medical purposes, etc. For this purpose, an HD-TV system corresponding to 3 times resolution of the currently used NTSC has been developed, but a superhigh resolution HD-TV system corresponding to 4 times resolution of the NTSC has not to be proposed.

SUMMARY OF THE INVENTION

It is an object of the present invention to provide an encoding device and a method thereof capable of producing superhigh resolution video signals.

It is another object of the present invention to provide an encoding device and a method thereof for selectively transmitting not only the picture of a 1×NTSC level but also superhigh resolution pictures of 2×NTSC, 3×NTSC or 4×NTSC levels.

According to an aspect of the present invention, an inventive encoding device reduces the bandwidth of sub-bands and uses a sub-band coding technique in the case where the bandwidth of channels is restricted, thereby to selectively transmit not only the picture of a 1×NTSC level but also the superhigh resolution pictures of 2×NTSC, 3×NTSC or 4×NTSC levels. For this end, the device includes a 3-dimensional low pass filter 4 for separating the signal output from an A/D converter 3 into 3-dimensional sub-blocks of chrominance signal, and a matrix circuit 5 for separating the signals output from the A/D converter 3 into luminance and chrominance signals. Furthermore, a horizontal, vertical and temporal QMFs 6, 8 and 10 divides the luminance signal into a plurality of horizontal, vertical and temporal sub-blocks in the direction of a horizontal, vertical and temporal axes and compresses the above sub-blocks. A motion detector 15 detects a motion signal corresponding to a still region, a semi-motion region and a motion region. An adaptive filter selector 16 selectively generates the signal of high band luminance sub-block signals output from the temporal QMF 10. A multiplexer 17 multiplexes the sub-block of chrominance signals output from the 3-dimensional low pass filter 4, the low band sub-block signals output from the temporal QMF 10, and the high band sub-block signals output from the adaptive filter selector 16.

BRIEF DESCRIPTION OF THE DRAWINGS

For a better understanding of the invention and to show how the same may be carried into effect, reference will now be made, by way of example, to the accompanying diagrammatic drawings, in which.

DETAILED DESCRIPTION OF THE PREFERRED EMBODIMENT

Figure 1:
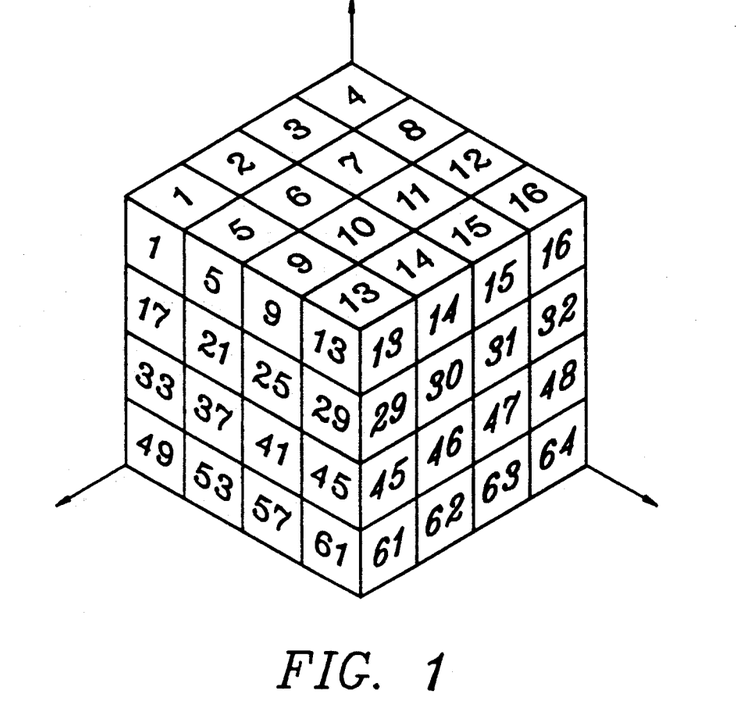
FIG. 1 illustrates the constitutional diagram of 3-dimensional sub-blocks for an original video signal spectrum.

Referring to FIG. 1, the spectrum of original video signals output from a video signal source such as a camera or a VTR is formed into 3-dimensional sub-blocks, and these sub-blocks are assigned with numbers for the sake of convenience.

Figure 2A:
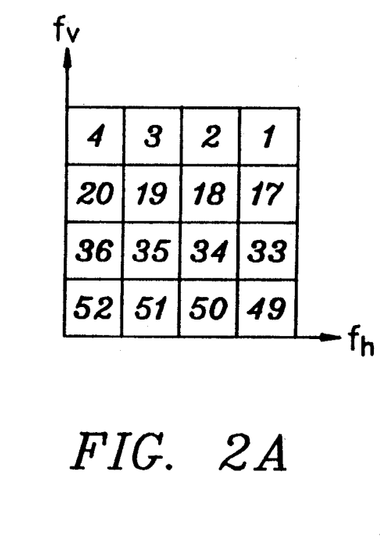
FIGS. 2A to 2D, illustrates the constitutional diagrams of sub-blocks in temporal axis of the original video signal spectrum.
Figure 2B:
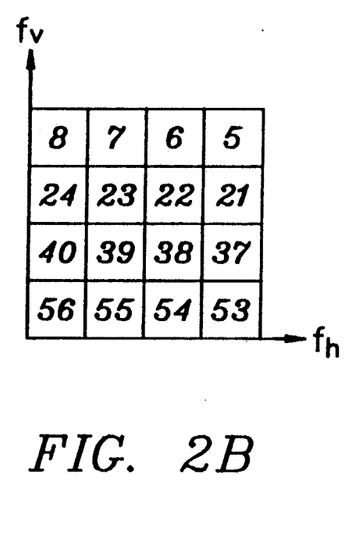
Figure 2C:
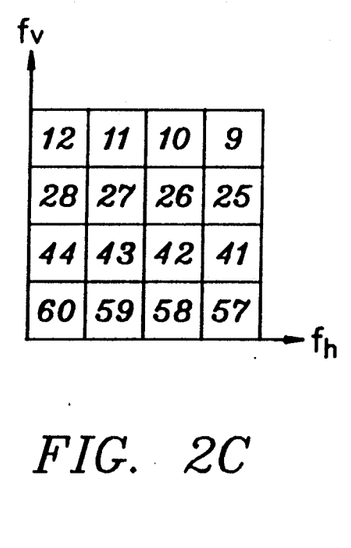
Figure 2D:
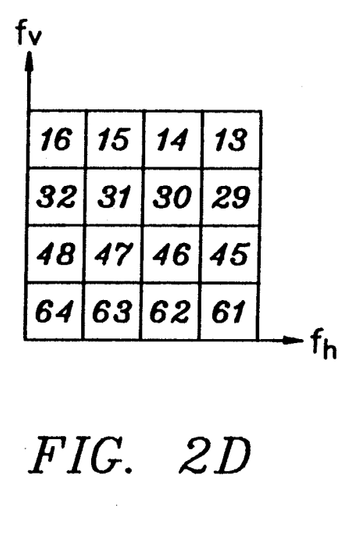

Referring to FIGS. 2A to 2D, FIG. 2A illustrates a constitutional diagram of sub-blocks as observed toward the spatial plane from a 15 Hz temporal axis. FIG. 2B illustrates the constitutional diagram of sub-blocks as observed toward the spatial plane from a 30 Hz temporal axis. FIG. 2C illustrates the constitutional diagram of sub-blocks as observed toward the spatial plane from a 45 Hz temporal axis and FIG. 2D illustrates the constitutional diagram of sub-blocks as observed toward the spatial plane from a 60 Hz temporal axis.

Figure 3:
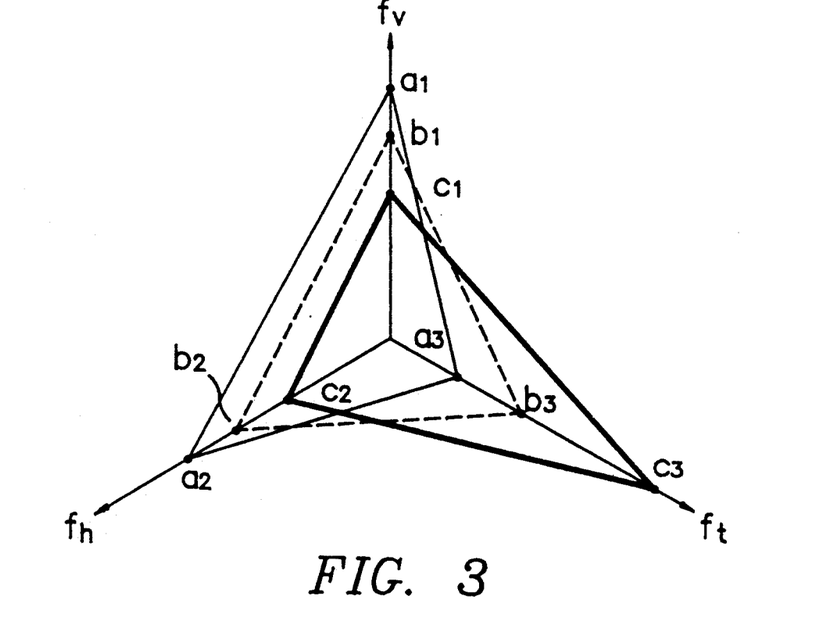
FIG. 3 illustrates a 3-dimensional signal process diagram on basis of the spectrum distribution of the video signal.

Referring to FIG. 3, reference codes a1, a2 and a3 indicate a processing distribution diagram for a still picture; reference codes b1, b2 and b3 indicate a processing distribution diagram for a semi-motion picture; reference codes c1, c2 and c3 indicate a processing distribution diagram for a motion picture, and the reference code a3 in the temporal axis ft indicates a 15 Hz component; the reference code b3 of the temporal axis ft indicates a 30 Hz component; and the reference code c3 of the temporal axis ft indicates a 60 Hz component.

Figure 4:
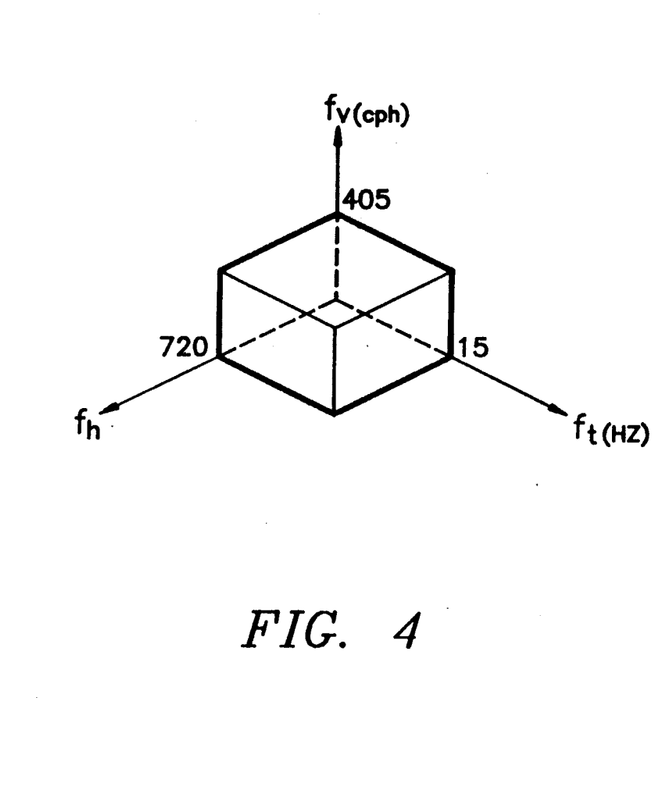
FIG. 4 illustrates the constitutional diagram of 3-dimensional an unit sub-block for a color signal spectrum.

Referring to FIG. 4, the size of an unit sub-block is decided by 720 samples per pixel width in the horizontal axis $f_h$, 405 cycles per height in the vertical axis $f_v$, and 15 Hz component in the temporal axis $f_t$.

Figure 5A:
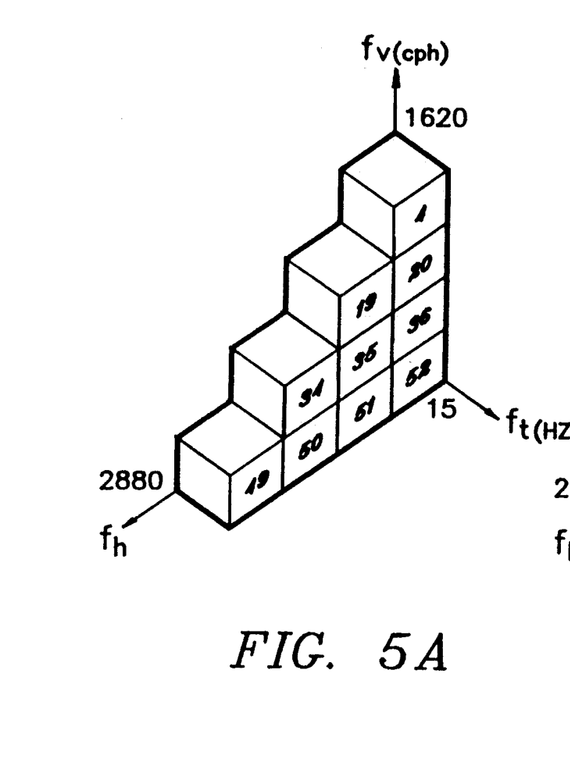
FIGS. 5A to 5C, illustrates the constitutional diagrams of 3-dimensional sub-blocks on basis of the spectrum distribution of FIG. 3.
Figure 5B:
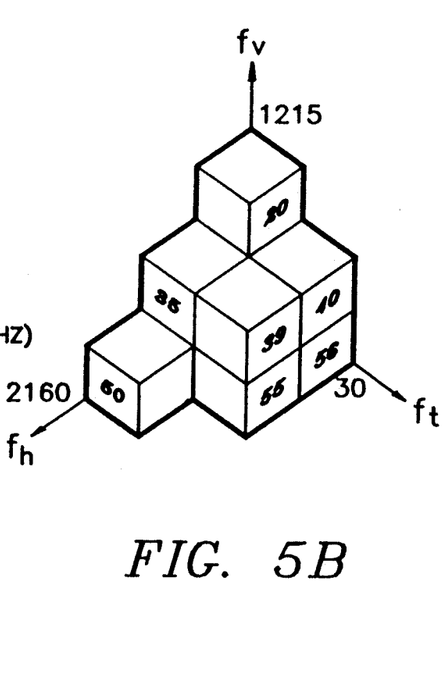
Figure 5C:
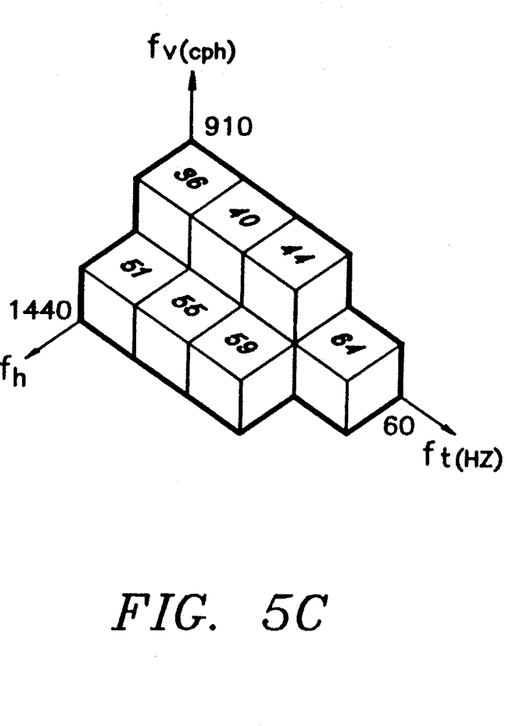

Referring to FIGS. 5A to 5C, it illustrates an energy distribution of the image signal of FIG. 3 in the form of sub-block diagrams of the 3-dimensional spectrum.

FIG. 5A illustrates the constitutional diagram of the sub-blocks for the original video signal in the case of still video signal; FIG. 5B illustrates the constitutional diagram of the sub-blocks for the original video signal in the case of semi-motion video signal; and FIG. 5C illustrates the constitutional diagram of the sub-blocks for the original video signal in the case of motion video signal.

As shown in FIG. 5A, if the still video signal is applied, the transmission is made in units of 13 sub-blocks including 10 luminance components and 3 chrominance components for the original video signal based on the 3-dimensional signal processing method of FIG. 3. As shown in FIG. 5B, if the semi-motion video signal is applied, the transmission is made also in units of 13 sub-blocks including 10 luminance components and 3 chrominance components. In this case, however, an expansion is made by one step in the direction of the temporal axis, and narrowings are carried out by one step each in the directions of the vertical and horizontal axes within the spatial region according to the 3-dimensional signal processing method of FIG. 3.

As shown in FIG. 5C, if the motion video signal is applied, the number of the sub-blocks is increased in the direction of the temporal axis, while the number of the sub-blocks is decreased in the spatial region. However, the number of the transmitted blocks is fixed to 13 in each case of the still, the semi-motion and the motion signals being applied. Thus only 13 blocks among the 64 blocks are transmitted, thereby enabling the band compression.

Figure 6A:
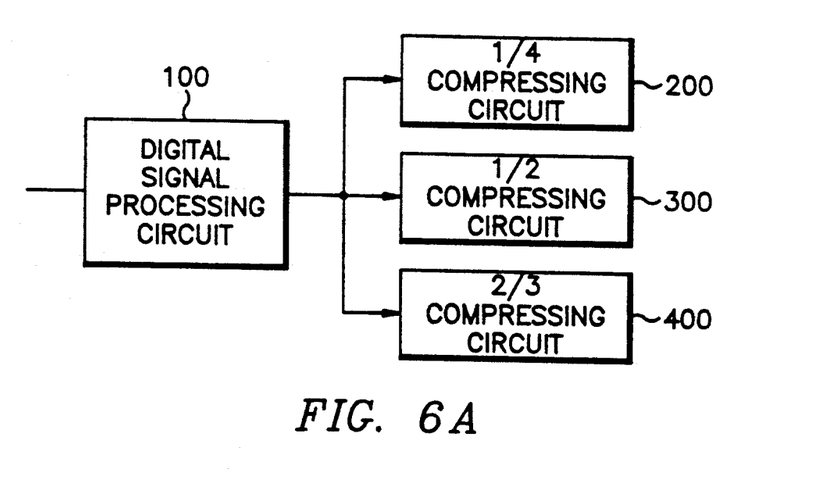
FIGS. 6A to 6E is a signal transformation block diagram and formats for compressing 4×NTSC signal.
Figure 6B:
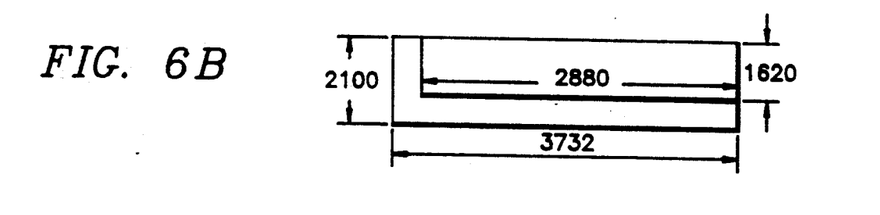
Figure 6C:
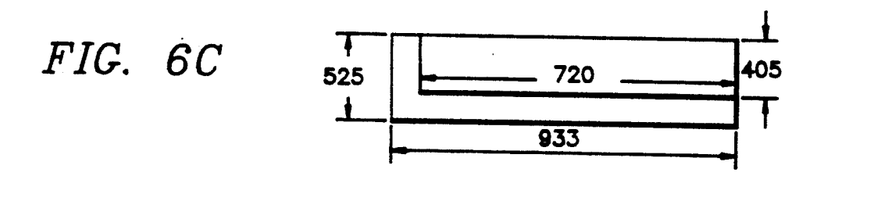
Figure 6D:
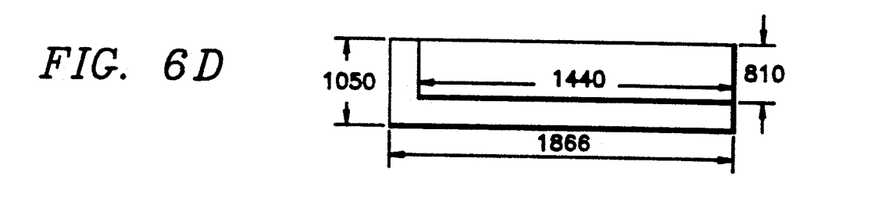

Referring to FIGS. 6A to 6E, FIG. 6A is a block diagram showing the constitution of a signal transforming circuit for compressing the 4×NTSC signal. A digital signal processing circuit 100 of FIG. 6A pre-filter 4×NTSC signals having 2100 vertical lines corresponding to 4 times that of NTSC signal in 3-dimension, thereby producing digital signal as shown in FIG. 6B. Here, the active scanning lines consist of 1620 vertical lines and 2880 horizontal pixels. The NTSC signal digitally processed by the digital signal processing circuit 100 is converted to the NTSC signal as shown in FIG. 6C by a ¼ compressing circuit 200. The active scanning lines of the NTSC signal converted by the ¼ compressing circuit 200 consist of 405 vertical lines and 720 horizontal pixels. The NTSC signal digitally processed by the digital signal processing circuit 100 is further converted to EDTV signal as shown in FIG. 6D by a ½ compressing circuit 300.

Figure 6E:
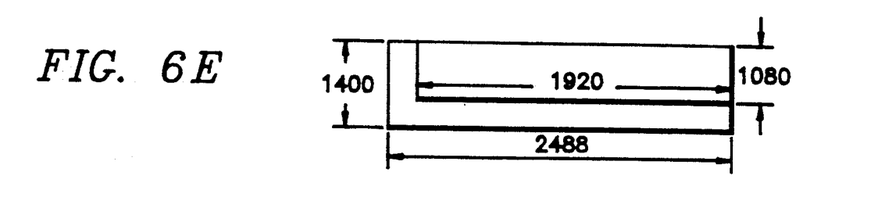

The active scanning lines of the EDTV signal converted by the ½ compressing circuit 300 consist of 810 vertical lines and 1440 horizontal pixels. The NTSC signal digitally processed the digital signal processing circuit 100 is converted to CIF(common image format)-HDTV signal as shown in FIG. 6E by a ⅔ compressing circuit 400. The active scanning lines of the CIF-HDTV signal converted by the ⅔ compressing circuit 400 consist of 1080 vertical lines and 1920 pixels.

Figure 7:
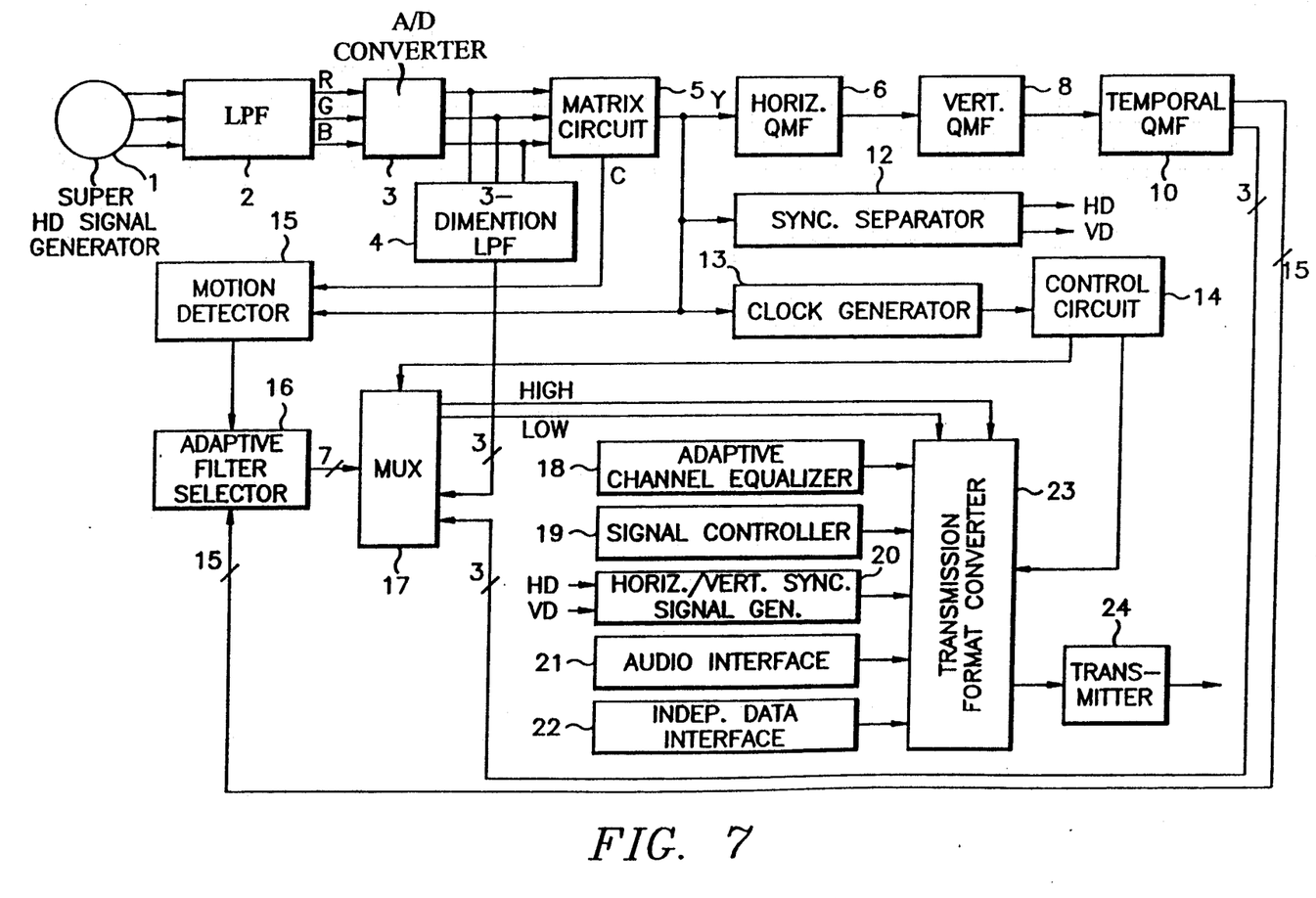
FIG. 7 is a block diagram for showing an encoding device of the present invention.

Referring to FIG. 7, a low pass filter (hereinafter referred to as LPF) 2 is supplied with analog red, green and blue (hereinafter referred to as R, G, B) video signals of 4×NTSC output from a super HD signal generator 1 to restrict the band thereof. An A/D converter 3 converts the band-restricted R, G, B analog video signals output from the low pass filter 2 into digital R, G, B video signals. A 3-dimensional LPF 4 separates the digital R, G, B video signals output from the A/D converter 3 into 3-dimensional sub-blocks of chrominance signals. A matrix circuit 5 separates the digital R, G, B video signals output from the A/D converter 3 into luminance and chrominance signals. A horizontal quadrature mirror filter (hereinafter referred to as QMF) 6 receiving the luminance signals separated by the matrix circuit 5, divides the luminance signal into horizontal 4 sub-blocks in t he direction of a horizontal axis. A vertical QMF 8 receiving the luminance signals of horizontal 4 sub-blocks divided by the horizontal QMF 5, divides the horizontal 4 sub-blocks into vertical 4 sub-blocks in the direction of a vertical axis. A temporal QMF 10 receiving the luminance signals of vertical 4 sub-blocks divided by the vertical QMF 8, divides the vertical 4 sub-blocks into temporal 4 sub-blocks in the direction of a temporal axis in order to generate a high and low band sub-block luminance signals.

A synchronization separator 12 separates out a vertical and horizontal synchronizing signals from the luminance signal separated by the matrix circuit 5. A horizontal and vertical synchronizing signals generator 20 generates a signal for synthesizing video information and audio information with the vertical and horizontal synchronizing signals separated by the synchronization separator 12. A clock generator 13 receiving the luminance signal separated by the matrix circuit 5, generates system clock pulses. A control circuit 14 controls the system according to the system clock pulses output from the clock generator 13. A motion detector 15' detects a motion signal corresponding to a still region, a semi-motion region and a motion region, in accordance with motion information of the luminance and chrominance signals separated by the matrix circuit 5. An adaptive filter selector 16 generates selectively the high band sub-block signals output from the temporal QMF 10, in accordance with the motion regions detected by the motion detector 15.

Figure 8:
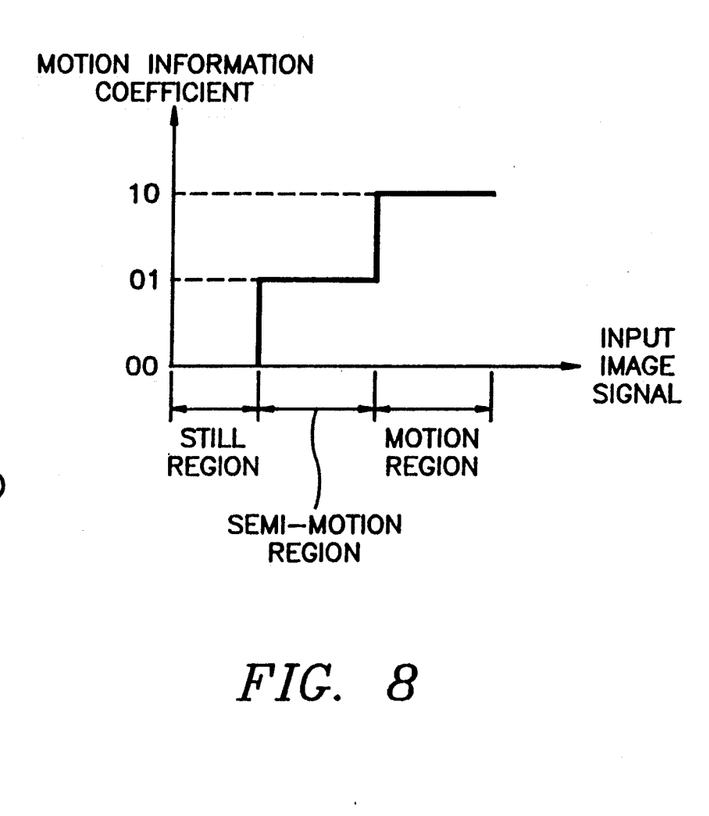
FIG. 8 illustrates waveform of motion information coefficients according to the input video signals of FIG. 7.

A multiplexer 17 multiplexes the high band sub-block signals output from the adaptive filter selector 16, the low band sub-block signals output from the temporal QMF 10, and the 3-dimensional sub-block signals of the R, G, B chrominance signals output from the 3-dimensional LPF 4, according to a control signal output from the control circuit 14. An adaptive channel equalizer 18 generates a reference signal in order to reduce the non-linear distortion and ghost phenomenon liable to occur on the transmitting channel. A signal controller 19 generates a control signal for being recognized the contents of the sub-blocks selectively generated from the adaptive filter selector 16. An audio interface 21 formats the audio signal source in a transmission format. An independent data interface 22 formats data of telephone, facsimile, computer and the like in the transmission format. A transmission format converter 23 implements a digital time-division multiplexing for the signals output from the adaptive channel equalizer 18, the signal controller 19, the vertical and horizontal synchronizing signals generator 20, the audio interface 21 and the independent data interface 22, and the high and low band sub-block signals output from the multiplexer 17, according to the control signal output from the control circuit 14. A transmitter 24 transmits the multiplexed signals output from the transmission format converter 23. FIG. 8 shows a waveform of motion information coefficients according to the input video signals of FIG. 7.

Hereinafter, a preferred embodiment of the present invention will be described in further detail referring to FIGS. 1 to 8.

The 4×NTSC analog video signal of R, G, B components output from the super HD signal generator 1 is limited band thereof by the low pass filter 2 as shown in FIG. 7. The super HD signal generator 1 produces the signals output from the ¼ compressing circuit 200, the ½ compressing circuit 300 and the ⅜ compressing circuit 400 of FIG. 6. The A/D converter 3 receives the analog video signals of R, G, B components of which bands are restricted by the low pass filter 2, and then, the A/D converter 3 converts the received analog video signal of R, G, B components to a digital R, G, B video signals. Then the 3-dimensional LPF 4 separates the signals output from the A/D converter 3 into the 3-dimensional sub-blocks of R, G, B chrominance signals.

The matrix circuit 5 receiving the R, G, B digital video signals output from the A/D converter 3, separates out luminance signal and chrominance signal therefrom. The horizontal QMF 6 receiving the separated luminance signal output from the matrix circuit 5, filters the received signals in order to divide the received signals into horizontal 4 sub-blocks in the direction of the horizontal axis. The vertical QMF 8 receiving the luminance signal of the horizontal 4 sub-blocks divided by the horizontal QMF 6, performs a filtering so that the horizontal 4 sub-blocks can be divided into the vertical 4 sub-blocks in the direction of the vertical axis. The temporal QMF 10 receiving the luminance signal of the vertical 4 sub-blocks divided by the vertical QMF 8, performs a filtering so that the vertical 4 sub-blocks can be divided into the temporal 4 sub-blocks in the direction of the temporal axis, so that 3-dimensional sub-blocks can be produced as shown in FIG. 1. The 3-dimensional sub-blocks of FIG. 1 are constituted into the 3-dimensional sub-blocks of FIGS. 5A to 5C in accordance with the motion signal corresponding to the still region, the semi-motion region and the motion region.

Of the sub-blocks constituted as shown in FIGS. 5A to 5C, the 3 sub-blocks of the low band output from the temporal QMF 10 are 36, 51 and 52, while the 15 sub-blocks of the high band therefrom are 4, 19, 20, 34, 35, 49 and 50; 39, 40, 55 and 56; and 44, 59, 60 and 64. The synchronization separator 12 receiving the luminance signals separated by the matrix circuit 5, separates out the vertical and horizontal synchronizing signals therefrom. The horizontal and vertical synchronizing signal generator 20 generates the signal for synthesizing the video information and audio information with the vertical and horizontal synchronizing signals separated by the synchronization separator 12 when the video information and audio information are transmitted in transmission formats.

Meanwhile, the clock generator 13 receiving the luminance signal separated by the matrix circuit 5, generates the system clock pulses. The control circuit 14 receiving the system clock pulses output from the clock generator 13, generates the system control signal. The motion detector 15 receiving the luminance and chrominance signals separated by the matrix circuit 5, generates "00" in a still region, "01" in a semi-motion region, and "10" in a motion region, by 2-bit, in accordance with the motion information of the luminance and chrominance signals as shown in the motion information detection waveform of FIG. 8. The adaptive filter selector 16 receiving the 15 high band sub-blocks output from the temporal QMF 10, selectively generates 7 sub-blocks in accordance with the motion regions detected by the motion detector 15. The multiplexer 17 receives 7 sub-blocks selected by the adaptive filter selector 16, 3 reference sub-blocks 36, 51 and 52 of the low band output from the temporal QMF 10, and 3 sub-blocks of R, G, B chrominance signals output from the 3-dimensional LPF 4. Then the multiplexer 17 multiplexes the signals applied thereto and generates the R, G, B sub-blocks or 3 reference sub-blocks 36, 51 and 52 of the low band, and the 7 sub-blocks of the high band, according to the control signal output from the control circuit 14.

The adaptive channel equalizer 18 generates the signals for reducing the ghost and non-linear distortion phenomena being occurred on the transmitting channel. The signal control circuit 19 generates the control signal in order that the contents of the sub-blocks selected by the adaptive filter selector 16 can be recognized. The vertical and horizontal synchronizing signal generator 20 generates the signal for synthesizing the video information and audio information with the vertical and horizontal synchronizing signals output from the synchronization separator 12 when the video information and audio information are transmitted in the transmission format. The audio interface 21 formats the audio signal source in the transmission format. The independent data interface 22 formats the data signals of telephone, facsimile, computer and the like in the transmission format. The transmission format converter 23 receiving the signals output from the adaptive channel equalizer 18, the signal control circuit 19, the vertical and horizontal synchronizing signals generator 20, the audio interface 21 and the independent data interface 22, and the high and low band sub-block signals output from the multiplexer 17, implements the digital time-division multiplexing for the signals applied thereto according to the control signal output from the control circuit 14. Then the transmitter 24 transmits the multiplexed signals by the transmission format converter 23 as digital signals.

According to the present invention as described above, there is an advantage that an encoding device can be selectively transmit not only the picture of a 1×NTSC level but also the superhigh resolution pictures of 2×NTSC, 3×NTSC or 4×NTSC levels, by reducing the bandwidth of sub-bands and by using a sub-band coding technique in the case where the bandwidth of channels is restricted. Further, even in the case of a large picture of over 300 inches, any degradations of the picture quality can be avoided, and a clear picture can be obtained.

While the invention has been particularly shown and described with reference to a preferred embodiment, it will be understood by those skilled in the art that modifications in detail may be made without departing from the spirit and scope of the invention.

I claim:

1. An encoding device for a super high definition television system including a super high definition signal generator, comprising:
   first filter means for low-pass filtering super NTSC analog video signals of red, green and blue components output from said super high definition signal generator;
   converter means for converting the signals output from said first filter means into digital red, green and blue video signals;
   second filter means for separating the signals output from said converter means into three-dimensional sub-block red, green and blue chrominance signals;

matrix means for separating the signals output from said converter means into luminance and chrominance signals;

horizontal quadrature mirror filter means connected to said matrix means, for dividing said luminance signal into a plurality of horizontal sub-blocks in a horizontal axis direction;

vertical quadrature mirror filter means for dividing said horizontal sub-blocks into a plurality of vertical sub-blocks in a vertical axis direction;

temporal quadrature mirror filter means for dividing said vertical sub-blocks into a plurality of temporal sub-blocks in a temporal axis direction, and for generating high and low band sub-block luminance signals;

synchronizing signals generator means for separating synchronizing signals from said luminance signal output from said matrix means, and for generating a signal for synthesizing video signals and audio signals with said synchronizing signals;

clock generator means coupled to receive said luminance signal output from said matrix means, for generating a system clock pulses;

control means for controlling the system according to said system clock pulses;

motion detector means connected to said matrix, for detecting a motion signal corresponding to a still region, a semi-motion region and a motion region in accordance with motion values of said luminance and chrominance signals output from said matrix means;

adaptive filter selector means for selectively generating said signal of high band luminance sub-block signals output from said temporal quadrature mirror filter means in accordance with said motion signal;

multiplexer means coupled to receive said three-dimensional sub-block red, green and blue chrominance signals output from said second filter means, said low band sub-block signals output from said temporal quadrature mirror filter means, and said high band sub-block signals output from said adaptive filter selector means, for multiplexing the received signals according to a control signal output from said control means;

transmission format converter means coupled to receive said high and low band sub-block signals output from said multiplexer means and the signal output from said synchronizing signal generator means, for implementing a digital time-division multiplexing for the signals applied thereto according to said control signal output from said control means to provide format converted signals; and transmitter means for transmitting said format converted signals.

2. An encoding method for a super high definition television system, comprising the steps of:

low pass filtering super NTSC red, green and value analog video signals and converting said analog video signals into digital red, green and blue signals;

separating the digital red, green and blue signals into 3-dimensional sub-blocks of chrominance signals;

separating the digital red, green and blue signals into luminance and chrominance signals to divide said separated luminance signal into a plurality of horizontal sub-blocks in a horizontal axis direction;

dividing said horizontal sub-blocks into a plurality of vertical sub-blocks in a vertical axis direction;

dividing said vertical sub-blocks into a plurality of temporal sub-blocks in a temporal axis direction to generate low and high band sub-block luminance signals;

separating synchronizing signals from said luminance signal and generating a signal for synthesizing video signals and audio signals in accordance with said synchronizing signals;

generating a system control signal according to said luminance signal in dependence upon clock pulses;

detecting a motion signal corresponding to a still region, a semi-motion region and a motion region in accordance with motion values of said luminance and said chrominance signals;

selectively processing said signal of high band sub-block luminance signals in accordance with the motion signal;

multiplexing said 3-dimensional sub-blocks of chrominance signals, said low band sub-block luminance signals and aid high band sub-block signals selectively according to said system control signal to provide multiplexed signals;

implementing a digital time-division multiplexing for said multiplexed signals according to said system control signal; and transmitting said multiplexed signals.

3. An encoder, comprising:

means for providing video signals;

first filter means for filtering said video signals to provide three-dimensional sub-block chrominance signals;

matrix means for separating said video signals into luminance signals and chrominance signals;

second filer means for filtering said luminance signals to provide high and low band sub-block luminance signals by dividing said luminance signals into horizontal sub-blocks in a direction of a horizontal axis, vertical sub-blocks in a direction of a vertical axis, and temporal sub-blocks in a direction of a temporal axis;

motion detector means for providing motional signals in dependence upon detection of motion values representative of one of a still region, a semi-motion region and a motion region of said luminance signals and said chrominance signals;

adaptive filter selector means for enabling transmission of selected high band sub-block luminance signals from said high band sub-block luminance signals in dependence upon said motion signals;

multiplexer means for multiplexing said selected high band sub-block luminance signals, said low band sub-block luminance signals and said three-dimensional sub-block chrominance signals in accordance with a first control signal to provide multiplexed signals; and transmission format converter means for converting said multiplexed signals into a selected format suitable for transmission in accordance with a second control signal.

4. The encoder as claimed in claim 3, further comprising:

synchronizing separator means for providing vertical and horizontal synchronizing signals in dependence upon said luminance signals; and synchronizing generator means for synthesizing video and audio information with said vertical and horizontal synchronizing signals upon transmission of said multiplexed signals in said selected format.

5. The encoder as claimed in claim 4, further comprising adaptive channel equalizer means for generating signals to said transmission format converter means to reduce non-linear distortion upon transmission of said multiplexed signals in said selected format.

6. The encoder as claimed in claim 5, further comprising signal identifier means for providing an identified signal to recognize said selected high band sub-block luminance signals via said multiplexer means.

7. The encoder as claimed in claim 3, wherein said second filter means comprises:
   a horizontal quadrature mirror filter coupled to receive said luminance signals for filtering and dividing said luminance signals into a plurality of horizontal sub-blocks in the direction of said horizontal axis;
   a vertical quadrature mirror filter for filtering and dividing said plurality of horizontal sub-blocks into a plurality of vertical sub-blocks in the direction of said vertical axis; and
   a temporal quadrature mirror filter for filtering and dividing said plurality of vertical sub-blocks into a plurality of temporal sub-blocks in the direction of said temporal axis.

8. A method for encoding a super high definition television signals, comprising the steps of:
   receiving video signals;
   filtering said video signals to provide three-dimensional sub-block chrominance signals;
   separating said video signals into luminance signals and chrominance signals;
   filtering and dividing said luminance signals into a plurality of horizontal sub-blocks in a direction of said horizontal axis;
   filtering and dividing said plurality of horizontal sub-blocks into a plurality of vertical sub-blocks in a direction of said vertical axis; and
   filtering and dividing said plurality of vertical sub-blocks into a plurality of temporal sub-blocks in a direction of said temporal axis;
   detecting motion values representative of one of a still region, a semi-motion region and a motion region of said luminance signals and said chrominance signals to provide motion signals;
   enabling transmission of selected high band sub-block luminance signals from said high band sub-block luminance signals in dependence upon said motion signals;
   multiplexing said selected high band sub-block luminance signals, said low band sub-block luminance signals and said three-dimensional sub-block chrominance signals in accordance with a first control signal to provide multiplexed signals; and
   converting said multiplexed signals into a selected format suitable for transmission in accordance with a second control signal.

9. The method for encoding as claimed in claim 8, further comprising the steps of:
   providing vertical and horizontal synchronizing signals in dependence upon said luminance signals;
   synthesizing video and audio information with said vertical and horizontal synchronizing signals upon transmission of said multiplexed signals in said selected format; and
   generating equalized signals to reduce non-linear distortion upon transmission of said multiplexed signals in said selected format.

10. An encoder, comprising:
    means for receiving digital video signals representative of red, green and blue components; p1 first filter means for filtering said digital video signals to provide threedimensional sub-block chrominance signals;
    matrix means for separating said digital video signals into luminance signals and chrominance signals;
    second filter means for filtering said digital luminance signals to provide high and low band sub-block luminance signals by dividing said digital luminance signals into horizontal sub-blocks in a direction of a horizontal axis, vertical sub-blocks in a direction of a vertical axis, and temporal sub-blocks in a direction of a temporal axis;
    motion detector means for providing motion signals in dependence upon detection of motion values representative of one of a still region, a semi-motion region and a motion region of said luminance signals and said chrominance signals;
    adaptive filter selector means for enabling transmission of selected high band sub-block luminance signals from said high band sub-block luminance signals in dependence upon said motion signals;
    multiplexer means for multiplexing said selected high band sub-block luminance signals, said low band sub-block luminance signals and said three-dimensional sub-block chrominance signals in accordance with a first control signal to provide multiplexed signals; and
    transmission format converter means for converting said multiplexed signals into a selected digital format suitable for transmission in accordance with a second control signal.

11. The encoder as claimed in claim 10, further comprising:
    synchronizing separator means for providing vertical and horizontal synchronizing signals in dependence upon said digital luminance signals; and
    synchronizing generator means for synthesizing video and audio information with said vertical and horizontal synchronizing signals upon transmission of said multiplexed signals in said selected digital format.

12. The encoder as claimed in claim 11, further comprising adaptive channel equalizer means for generating equalized signals to said transmission format converter means to reduce non-linear distortion upon transmission of said multiplexed signals in said selected digital format.

13. The encoder as claimed in claim 12, further comprising signal identifier means for providing an identified signal to recognize said selected high band sub-block luminance signals via said multiplexer means.

14. The encoder as claimed in claim 10, wherein said second filter means comprises:
    a horizontal quadrature mirror filter coupled to receive said luminance signals for filtering and dividing said luminance signals into a plurality of horizontal sub-blocks in the direction of said horizontal axis;
    a vertical quadrature mirror filter for filtering and dividing said plurality of horizontal sub-blocks into a plurality of vertical sub-blocks in the direction of said vertical axis; and
    a temporal quadrature mirror filter for filtering and dividing said plurality of vertical sub-blocks into a plurality of temporal sub-blocks in the direction of said temporal axis.

* * * * *

UNITED STATES PATENT AND TRADEMARK OFFICE
CERTIFICATE OF CORRECTION

PATENT NO. : 5,235,421
DATED : 10 August 1993
INVENTOR(S) : Tae-Kwon Yang

It is certified that error appears in the above-indentified patent and that said Letters Patent is hereby corrected as shown below:

Column 1,

Line 19,    replace "sampling" with --film at most, and for this purpose, the multiple subnyquist sub-sampling--;

Column 2,

Line 52,    change "al" to --a1--;

Line 56,    change "cl" to --c1--;

Line 64,    change "f." to --$f_v$--;

Column 4,

Line 7,    change "in t he" to --in the--;

Column 5,

Line 1,    change "4xNTSCanalog" to --4xNTSC analog--;

UNITED STATES PATENT AND TRADEMARK OFFICE
CERTIFICATE OF CORRECTION

PATENT NO. : 5,235,421
DATED : 10 August 1993
INVENTOR(S) : Tae-Kwon Yang

It is certified that error appears in the above-indentified patent and that said Letters Patent is hereby corrected as shown below:

Column 7,

Line 59,    change "value" to --blue--;

Column 8,

Line 22,    change "aid" to --said--;

Column 10,

Line 3,    delete "p1"; and after "components;", create a new paragraph;

UNITED STATES PATENT AND TRADEMARK OFFICE
CERTIFICATE OF CORRECTION

PATENT NO. : 5,235,421
DATED : 10 August 1993
INVENTOR(S) : Tae-Kwon Yang

It is certified that error appears in the above-indentified patent and that said Letters Patent is hereby corrected as shown below:

Column 10, line 5, change "three dimensional" to --three-dimensional--.

Signed and Sealed this

Twentieth Day of September, 1994

Attest:

BRUCE LEHMAN

*Attesting Officer*   *Commissioner of Patents and Trademarks*